(12) United States Patent
Wildeman et al.

(10) Patent No.: US 8,484,239 B2
(45) Date of Patent: Jul. 9, 2013

(54) METHOD AND APPARATUS IN A DATABASE SYSTEM

(75) Inventors: Mattias Wildeman, Stockholm (SE); Mats Boman, Frisco, TX (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 149 days.

(21) Appl. No.: 12/675,905

(22) PCT Filed: Aug. 29, 2007

(86) PCT No.: PCT/SE2007/000753
§ 371 (c)(1),
(2), (4) Date: Mar. 1, 2010

(87) PCT Pub. No.: WO2009/029008
PCT Pub. Date: Mar. 5, 2009

(65) Prior Publication Data
US 2010/0250584 A1    Sep. 30, 2010

(51) Int. Cl.
*G06F 17/30* (2006.01)

(52) U.S. Cl.
USPC ......................................... 707/769

(58) Field of Classification Search
USPC ......................................... 707/769
See application file for complete search history.

(56) References Cited

U.S. PATENT DOCUMENTS

| | | | | |
|---|---|---|---|---|
| 5,515,531 A * | 5/1996 | Fujiwara et al. | | 1/1 |
| 5,787,444 A * | 7/1998 | Gerken et al. | | 1/1 |
| 5,937,343 A * | 8/1999 | Leung | | 455/403 |
| 6,243,715 B1 * | 6/2001 | Bogantz et al. | | 707/612 |
| 6,366,933 B1 * | 4/2002 | Ball et al. | | 715/203 |
| 6,460,052 B1 * | 10/2002 | Thomas et al. | | 707/695 |
| 6,493,727 B1 * | 12/2002 | Huang et al. | | 707/610 |
| 6,826,750 B1 * | 11/2004 | Curtis et al. | | 717/170 |
| 7,707,230 B1 * | 4/2010 | Brenner | | 707/803 |
| 7,743,052 B2 * | 6/2010 | Bestgen et al. | | 707/715 |
| 7,769,794 B2 * | 8/2010 | Moore et al. | | 707/831 |
| 2002/0059299 A1 * | 5/2002 | Spaey | | 707/104.1 |
| 2006/0206928 A1 | 9/2006 | Kamei | | |
| 2007/0143363 A1 | 6/2007 | Agarwal et al. | | |
| 2008/0208829 A1 * | 8/2008 | Limonov | | 707/4 |

FOREIGN PATENT DOCUMENTS

| JP | H09-293010 | 4/1996 |
|---|---|---|
| WO | WO 03/105026 | 12/2003 |

* cited by examiner

*Primary Examiner* — Binh V Ho
(74) *Attorney, Agent, or Firm* — Roger S. Burleigh (57) ABSTRACT

A method and a telecommunication database system for facilitating modifications in the database and the handling of data queries. The database comprises an original dataset with data entries containing original data for different objects, and at least one auxiliary dataset with data entries containing updated data for at least some of the objects. A dataset tag is included in the data entries in either dataset indicating which dataset each entry belongs to. When a querying logic makes a query for data in a wanted data entry, the wanted data entry is obtained from a dataset determined based on the dataset tag in the data entry.

21 Claims, 5 Drawing Sheets

METHOD AND APPARATUS IN A DATABASE SYSTEM

TECHNICAL FIELD

The present invention relates generally to a method and apparatus in a telecommunication database system that may increase flexibility and facilitate the management of data queries and data modification operations.

BACKGROUND

In telecommunication systems, large databases are used for storing various data in different data entries for subscribers or users of communication terminals, which can be retrieved by authorised requesting parties such as other terminal users, applications, services and various network nodes. In this description, the term "requesting party" is used to generally represent any entity retrieving data from a database.

The data stored may relate to, e.g., the translation or mapping of telephone numbers, subscription settings, terminal specifications, user preferences, etc. Entries in the database for a certain type of data contain such data for all users, where each data entry is typically associated with a specific user. Data may also be stored in this manner for entities other than individual users, such as user groups, services, network nodes and equipment elements, generally referred to as "objects".

Performing major modifications in such databases for a large number of data entries of corresponding objects can be associated with various problems, e.g. relating to performance, flexibility, consistency, time for deployment and workload.

For example, if a certain type of data is to be updated and replaced by another type of data for a multitude of objects in a database, e.g. the mapping of circuit—switched telephone numbers and packet-switched addresses for subscribers, the data entries must be changed one by one and the changes will thus progress through the database at a limited rate. If these changes are made while the database is active and available for data queries, some data entries will be updated but not others, resulting in inconsistency and potential data retrieving errors. For a very large database, it may take some time before this process is completed.

In the case of a configuration error or the like, it may further be necessary to make a "rollback" of executed updates, which is limited by the time it takes to undo the individual data entries one by one. In some cases, it may even be necessary to keep the database closed for requests until all entries have been updated properly to avoid errors and inconsistency. The new data entries could also be made available from a completely new database as they are added while the original database is closed, i.e. no data will be available from the non-updated entries.

Another obvious alternative when changing the data type is to keep the original database running as is, if possible, while building a new separate database by adding data entries for all subscribers, and then instantly switch from the original database to the new one when completed. In the latter case, the original database can be replaced with the new updated one in a single operation to avoid inconsistency and errors, but deployment of the new type of data in the system will then of course be delayed for all subscribers until the new database is completed.

Furthermore, in this known solution, two databases must be maintained before the new database can be activated and the old one is closed, which means that any provisioning operations must be made in both databases to keep them synchronised. In the new database, all entries must be created regardless of whether the old entries are changed or not. This alternative is thus not suitable when only a fraction of the entries are to be updated in an otherwise large database, due to the workload of copying the same data from the old database into the new database for the other entries.

Thus, selecting either of the above alternatives gives no room for flexibility with respect to how and when the new data is made available. It may also be desirable to present one type of data to certain requesting parties and another type of data to others which is rather complicated, if not impossible, to do in the known database systems.

Figure 1:
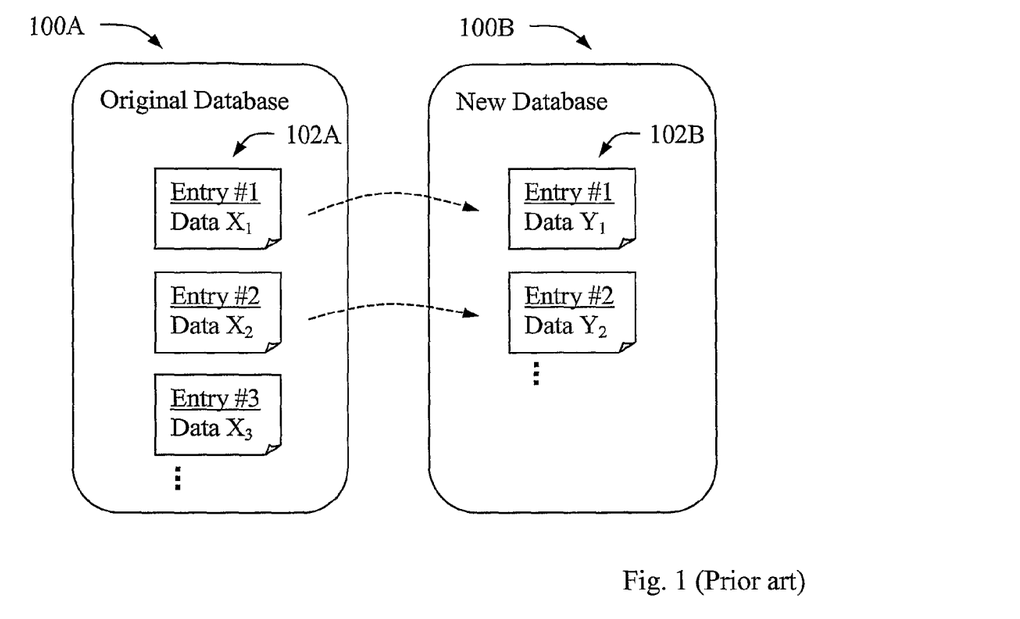
FIG. 1 is a schematic block diagram illustrating how a database can be modified according to the prior art.

FIG. 1 illustrates how a database 100A with original data entries 102A is replaced by a new separate database 100B with modified data entries 102B. In the original database 100A, data entries #1, 2, 3 . . . hold data $X_1$, $X_2$, $X_3$ . . . , respectively, for individual objects, e.g. users in a telecommunication system. For example, each data entry may be headed by an identity for a subscription such as a traditional PSTN (Public Switched Telephone Network) telephone number, and the data X held in the entry may be a corresponding SIP (Session Initiation Protocol) address valid for that subscription, i.e. number mapping. The subscription identity can then be used as a key to the data entry when placing a data query.

The figure illustrates that the new database 100B is created by adding a data entry for each object, modified or not, where Data $X_1$ in entry #1 is replaced by Data $Y_1$, Data $X_2$ in entry #2 is replaced by Data $Y_2$, and so forth. In this way, the new modified database 100B is gradually built up, and when all data entries have been stored, database 100B can be activated for data queries in replacement of database 100A. Alternatively, the original database 100A can be kept closed while building the new one, and only the currently added entries in the new database 100B are available during the time it takes to complete the database 100B. As mentioned above, for entries not to be updated/modified, the same data must still be copied into the new database 100B.

Figure 2:
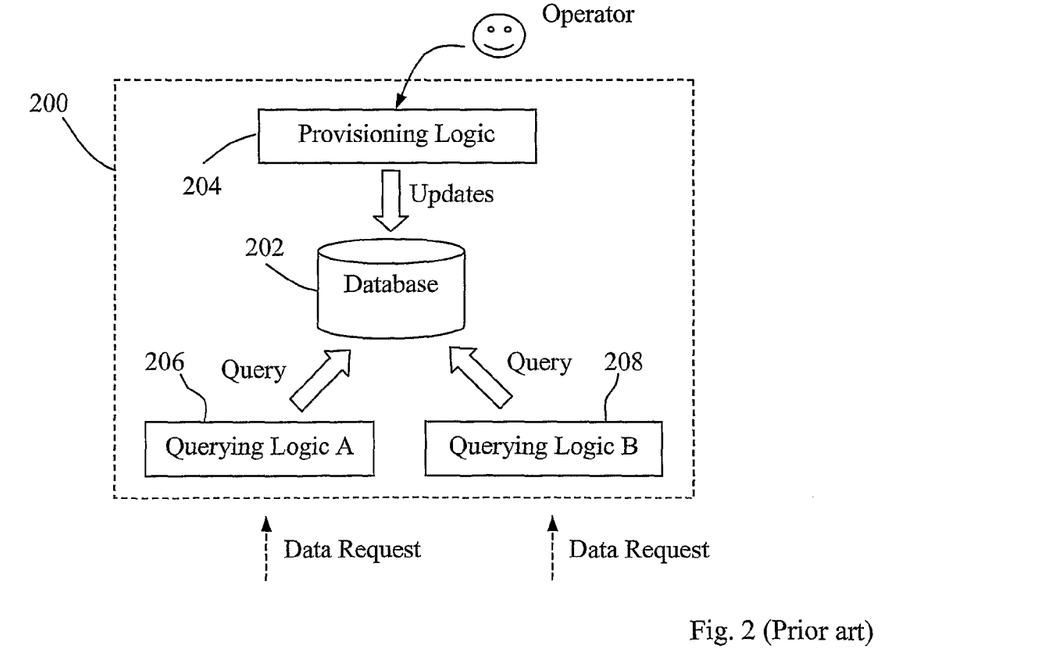
FIG. 2 is a schematic block diagram illustrating the management of a database system, according to the prior art.

FIG. 2 illustrates generally how a database system 200 can be operated. A database 202 contains multiple data entries for different objects, such as telecommunication users. A database operator can control the contents in the database 202 by means of a provisioning logic unit 204 that includes a suitable interface for entering operator commands and various data to be stored. The operator may thus input information to update the contents in the database 202 by adding, deleting or changing entries, generally referred to as "updates". The operator may also create an entirely new separate database, not shown, to replace an existing one as described above.

The database system 200 further contains a first querying logic unit A and a second querying logic unit B, both being adapted to handle data requests from requesting parties and to place corresponding data queries to the database 202, as shown, in order to obtain data and deliver suitable responses to the requesting parties.

As mentioned above, the present solutions for making database updates can be awkward to use and may be associated with, e.g., unwanted delays, limited flexibility, inconsistency and/or poor availability. Thus, it is not possible to perform time-instant modifications of individual data entries in large datasets without reducing the availability or introducing errors. The database systems of today have no simple flexible mechanism for controlling the availability or access to different data types for different viewers, e.g. to present different views or versions of data of the same object(s). Moreover, the option for making a "rollback" of executed updates, e.g. in the case of a configuration error, is limited by the time it takes to undo the individual data entries one by one.

SUMMARY

It is an object of the present invention to address at least some of the problems outlined above. It is thus generally desirable to avoid or at least reduce the drawbacks associated with the handling of large databases, particularly in connection with updating operations, as described in the background section above. These objects and others may be achieved primarily by providing a method and apparatus according to the attached independent claims.

According to one aspect, a method in a telecommunication database system is provided for obtaining data from a database containing data entries for a plurality of objects. The database comprises an original dataset with data entries holding original data for the objects, and an auxiliary dataset with data entries holding updated data for at least some of the objects. The data entries in the original dataset contain a first dataset tag and the data entries in the auxiliary dataset contain a second dataset tag, the dataset tags indicating to which dataset each entry belongs. In the method, a query is made for data from a wanted data entry, and data of the wanted data entry is obtained from a dataset determined based on the dataset tag in the data entry.

When a wanted dataset tag is specified in the query, the data is obtained from the data entry of the dataset according to the specified dataset tag. The data entries in the original dataset may further contain a dataset flag pointing to one of the original and auxiliary datasets. When no dataset tag is specified in the query, data and a dataset flag is obtained from the wanted data entry in the original dataset, and the correct dataset can be determined based on the returned dataset flag. If the obtained dataset flag is equal to the original dataset tag, the data obtained from the original dataset is used.

If the obtained dataset flag is different from the original dataset tag, it is checked whether the obtained dataset flag is equal to a dataset tag being set to active for the requesting party, and if not equal, the data obtained from the original dataset is used as default. If the obtained dataset flag is equal to the active dataset tag, another query is placed indicating the active dataset tag and the data is obtained from the data entry of a dataset according to the indicated dataset tag.

Information may be maintained on which dataset is active and valid to specific requesting parties, thereby presenting different views of the database to the respective requesting parties. The different views presented for specific requesting parties can also be changed by changing the active dataset for the respective requesting parties. Moreover, individual data entries can easily be moved between different datasets by changing their dataset tags.

According to another aspect, a telecommunication database system is provided, comprising a database containing data entries for a plurality of objects, and a querying logic unit for obtaining data from the database. The database comprises an original dataset with data entries holding original data for the objects, and an auxiliary dataset with data entries holding updated data for at least some of the objects. The data entries in the original dataset contain a first dataset tag and the data entries in the auxiliary dataset contain a second dataset tag the dataset tags indicating to which dataset each entry belongs. The querying logic unit is adapted to make a query for data from a wanted data entry and to obtain data of the wanted data entry from a dataset determined based on the dataset tag in the data entry.

According to another aspect, a database is provided containing data entries for a plurality of objects in a telecommunication system. The database comprises an original dataset with data entries holding original data for the objects, and an auxiliary dataset with data entries holding updated data for at least some of the objects. The data entries in the original dataset and in the auxiliary dataset contain dataset tags indicating to which dataset each entry belongs. Thereby, a querying logic unit is enabled to make a query for data from a wanted data entry and obtain data of the wanted data entry from a dataset determined based on the dataset tag in the data entry.

Further preferred features and benefits of the present invention will become apparent from the detailed description below.

BRIEF DESCRIPTION OF THE DRAWINGS

The present invention will now be described in more detail by means of preferred embodiments and with reference to the accompanying drawings, in which.

DETAILED DESCRIPTION

Briefly described, the present invention provides a solution for making the management of data queries and data modification operations easier and more flexible in a telecommunication database system comprising a database with multiple entries for different objects, e.g. users, in a telecommunication system. The database comprises an original dataset with data entries holding original data for the objects, and one or more auxiliary datasets with data entries holding updated data for at least some of the objects. Each auxiliary dataset, which also could be denoted as "supplementary" or "secondary", acts as a "shadow" dataset while the original dataset is still maintained.

Each data entry in either dataset contains a dataset tag indicating which dataset the entry belongs to, e.g., all entries in the original dataset may have a dataset tag 0, all entries in a first auxiliary dataset may have a dataset tag 1, and so forth. Thereby, a querying logic unit in the database system may place a query for a data entry and indicate from which dataset the wanted type of data entry should be retrieved. The data from that dataset will then be returned to the querying logic unit, e.g. for delivery to a requesting party.

In this way, the querying logic can easily control the deployment of updated data, and/or present different views of the database by indicating different dataset tags in the queries. For example, each new data entry can thus be deployed instantly after being entered in the auxiliary dataset, while still maintaining the original dataset in parallel. In addition, it is also possible to delay the deployment until all new data has been entered in the database, and then activate the new data at the same time for all entries by simply setting the new dataset tag in the queries. Using the dataset tags in entries of different datasets in this way, the same database can provide for both options and present different views of data for the same objects, among other things.

Figure 3:
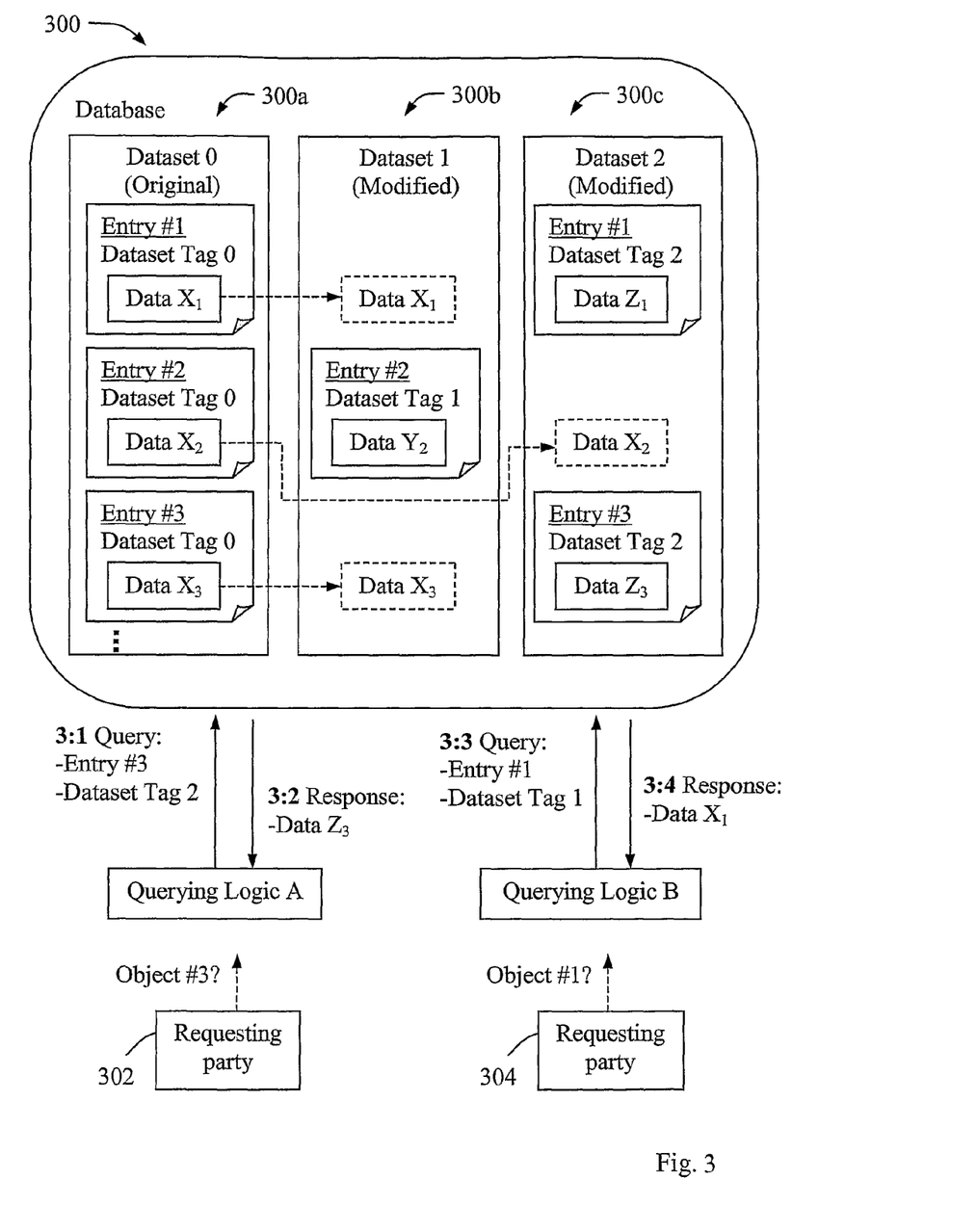
FIG. 3 is a schematic block diagram illustrating a telecommunication database system, according to one embodiment.

FIG. 3 illustrates the structure of a telecommunication database 300 according to one embodiment. The database 300 contains a dataset 300a, here called "Dataset 0", with original data entries for individual objects, e.g. users or subscribers in a telecommunication system. Thus, data entries #1, 2, 3 ... hold data $X_1$, $X_2$, respectively. Although only three data entries are shown here, a telecommunication database typically contain a huge number of data entries.

In addition, two auxiliary datasets with modified data entries are also built up in the database 300 in this example, namely a first auxiliary modified dataset 300b "Dataset 1" and a second auxiliary modified dataset 300c "Dataset 2", respectively, where only some of the entries from the original dataset have thus been updated in the auxiliary datasets. Each data entry in either dataset contains a supplementary field with a "dataset tag" indicating which dataset the entry belongs to. Thus, all entries in datasets 300a, 300b and 300c have the dataset tags 0, 1 and 2, respectively. The term dataset tag could alternatively be called a "dataset indication", a "dataset label", or similar.

In the shown example, an operator has updated data entry #2 in the first auxiliary dataset 300b by changing data $X_2$ into data $Y_2$. Further, in the second auxiliary dataset 300c, data entry #1 has been updated by changing data $X_1$ into data $Z_1$, and data entry #3 has been updated by changing data $X_3$ into data $Z_3$, while dataset 300a with the original entries is still maintained in parallel in the database 300. The updates may have been executed by means of a provisioning logic (not shown) as described for FIG. 2 above.

It should be further noted in this example that entries #1 and #3 have not been updated in the first auxiliary dataset 300b, and entry #2 has not been updated in the second auxiliary dataset 300c. Therefore, data $X_1$ and data $X_3$ could still be valid in dataset 1 and data $X_2$ could still be valid in dataset 2 for the corresponding data entries, as indicated by the dashed arrows. As shown in the figure, dataset 1 thereby provides a view with $X_1, Y_2, X_3$, whereas dataset 2 provides a view with $Z_1, X_2, Z_3$.

It is also possible to update the data of an entry differently in the auxiliary datasets, such that for entry #1, for example, the first auxiliary dataset 300b might contain updated data $Y_1$ and the second auxiliary dataset 300c might at the same time contain the differently updated data $Z_1$. Thereby, the flexibility of providing different views of the database can be further increased.

Querying logic units A and B are both connected to the database 300 to deal with data requests from different requesting parties, e.g. the shown requesting parties 302 and 304. Alternatively, it is possible that a querying logic unit, as described in this context, could be the actual user of retrieved data, thereby acting also as the requesting party or "client". Querying logic units A and B can be configured differently to present different views of the database 300, which will be explained in more detail below.

Each querying logic unit A, B has functionality for retrieving data of the accurate type from the proper dataset by means of queries, which may be dependent on the requesting party. According to the shown embodiment, the querying logic units A, B are adapted to provide an entry key or number in a data query, referring to the object in question, and also to indicate which dataset that data is wanted from by supplying the corresponding dataset tag in the query. If a query for a data entry indicates the tag of a dataset that has not been updated, i.e. lacking that entry, data from the original entry with dataset tag 0 may be given automatically as a default.

If a querying logic only provides the entry key but no dataset tag, dataset tag 0 may be used as a default to find the requested entry from the original dataset. It is also possible to use a dataset tag other than the original one as a default in the latter case. Another embodiment will be described later below with reference to FIG. 4 for dealing with queries with no dataset tag indicated.

Some basic steps shown in FIG. 3 illustrate how different exemplary data queries are executed according to the present example. A data query generally results in a response with data from the database 300 by means of a suitable data retrieval function in the database, not shown. Each shown step may involve the communication of one or more specific messages depending on the protocols used, which the skilled person would be capable to apply for implementing the described embodiments. It is assumed that requesting party 302 wants information on an object for which data is stored in entry #3 ("object #3"), and requesting party 304 wants information on another object for which data is stored in entry #1 ("object #1").

In a first shown step 3:1, the querying logic A makes a query for entry #3 to serve the requesting party 302. Querying logic A has determined that requesting party 302 is entitled to, or is best served by, data from the second auxiliary dataset 300c. According to different options, querying logic A may be configured to store information on which dataset is currently available, e.g. by setting a certain dataset as currently "active", at least to this particular requesting party 302.

Querying logic A therefore indicates that data is wanted from dataset 300c by including the dataset tag 2 in the query. In the database 300, data entry #3 has been updated with data $Z_3$ in dataset 2, 300c. Accordingly, data $Z_3$ is returned to querying logic A in a step 3:2.

In another shown step 3:3, the querying logic B makes a query for entry #1, also indicating that data is wanted from the first auxiliary dataset 1, 300b by including the dataset tag 1 in the query, to serve the requesting party 304. Since data entry #1 has not been updated in dataset 300b, the original data $X_1$ is still valid also for that dataset, as shown by the dashed arrow from data entry #1 in the original dataset 300a. Thus, dataset 1, 300b presents a view with data $X_1$ for entry #1, and Data $X_1$ is consequently returned to querying logic B in a further step 3:4.

The querying logic units A and B may maintain information, e.g. in lists or the like, on which dataset is active, i.e. valid, to specific requesting parties. Thus, in the example shown in FIG. 3, querying logic A is configured with dataset 1 activated and querying logic B is configured with dataset 2 activated, at least for the requesting parties 302 and 304, respectively. In this way, querying logic units A and B can easily present different views of the database 300 to different requesting parties, and/or change between the different views simply by changing the active dataset for the respective requesting parties. Of course, a querying logic may also be configured with a specific dataset activated for all requesting parties in order to make the data in that dataset generally available.

When doing modifications, data may be modified in an entry directly, either an original or a shadow entry, or a new shadow entry may be created in an auxiliary dataset while still maintaining the data entry in the original dataset. As shown above, more than one auxiliary dataset may be used to present multiple views for different requesting parties, and the present invention is not limited in this respect. For example, one requesting party may be entitled to view dataset 1 whereas another requesting party may be entitled to view dataset 2, and so forth.

An auxiliary dataset (shadow) may subsequently be merged into the original dataset, e.g. by copying the data from the shadow data entries into the original data entries, or by deleting the original entries and updating the dataset tags in the updated shadow data entries to be "dataset tag 0 (Original)". These data entries are thereby automatically moved to the original dataset. It is thus easy to move data entries between different datasets simply by changing their dataset tag field. However, data entries can be moved between different datasets in other ways as well and the present invention is not limited to the above-described examples of moving data entries between different datasets, e.g., for the purpose of merging.

A database structure and a procedure according to another embodiment for using data queries with no dataset tag indicated, will now be described with reference to FIG. 4. As in the example of FIG. 3, a database 400 contains a dataset 400*a* ("Dataset 0") with original data entries #1, 2, 3 . . . holding data $X_1, X_2, X_3$ . . . , respectively, as well as two auxiliary datasets 300*b* (Dataset 1) and 300*c* (Dataset 2). The data entries in datasets 300*a*, 300*b* and 300*c* contain dataset tags 0, 1 and 2, respectively. Further, an operator has modified the data entries in the auxiliary datasets in the same way as in FIG. 3, which will therefore not be described here in detail again.

In addition, each data entry in the original dataset 400*a* of this embodiment contains another supplementary field with a "dataset flag" pointing to a specific dataset, e.g. an auxiliary dataset in which the data entry has been updated. Thus, entry #1 in dataset 0 has a dataset flag 2 pointing to the corresponding entry #1 in dataset 2 which contains updated data $Z_1$. In a similar manner, entry #2 in dataset 0 has a dataset flag 1 pointing to the corresponding entry in dataset 1, and entry #3 in dataset 0 has a dataset flag 2 pointing to the corresponding entry in dataset 2. Although not shown in this example, it is possible to use a dataset flag 0 in a data entry, i.e. pointing to itself, if the original data entry has not been updated in any auxiliary dataset.

When a query for data of an object is made by a querying logic A, e.g. on behalf of a requesting party, the query referring only to the entry key or number of the object but not to any dataset tag, the data entry is obtained from the original dataset as a default. The querying logic A then checks the dataset flag field in the received original data entry. If the dataset flag=0.0 pointing to the original dataset, i.e. to itself, no further action is taken since the data in the original data entry is valid and has not been updated. The data in the obtained original data entry is therefore used, e.g. by delivery to the requesting party.

Otherwise, if the dataset flag≠0 pointing to an auxiliary dataset, the querying logic A compares that dataset flag with a dataset tag being set to active for the requesting party. If the dataset flag in the obtained entry is different from the active dataset tag, no further action is taken and the data in the obtained original data entry is used, e.g. by delivery to the requesting party. However, if the dataset flag in the obtained entry is equal to the active dataset tag, another query is placed that also includes the active dataset tag to which the dataset flag was pointing. Thereby, the correct data will be obtained and can be used, e.g. for delivery to the requesting party.

It is also possible to set more than one dataset as active, e.g. for specific requesting parties. For example, if the querying logic is configured with both dataset 0 and dataset 1 active, data from both datasets will be obtained upon queries.

Figure 4:
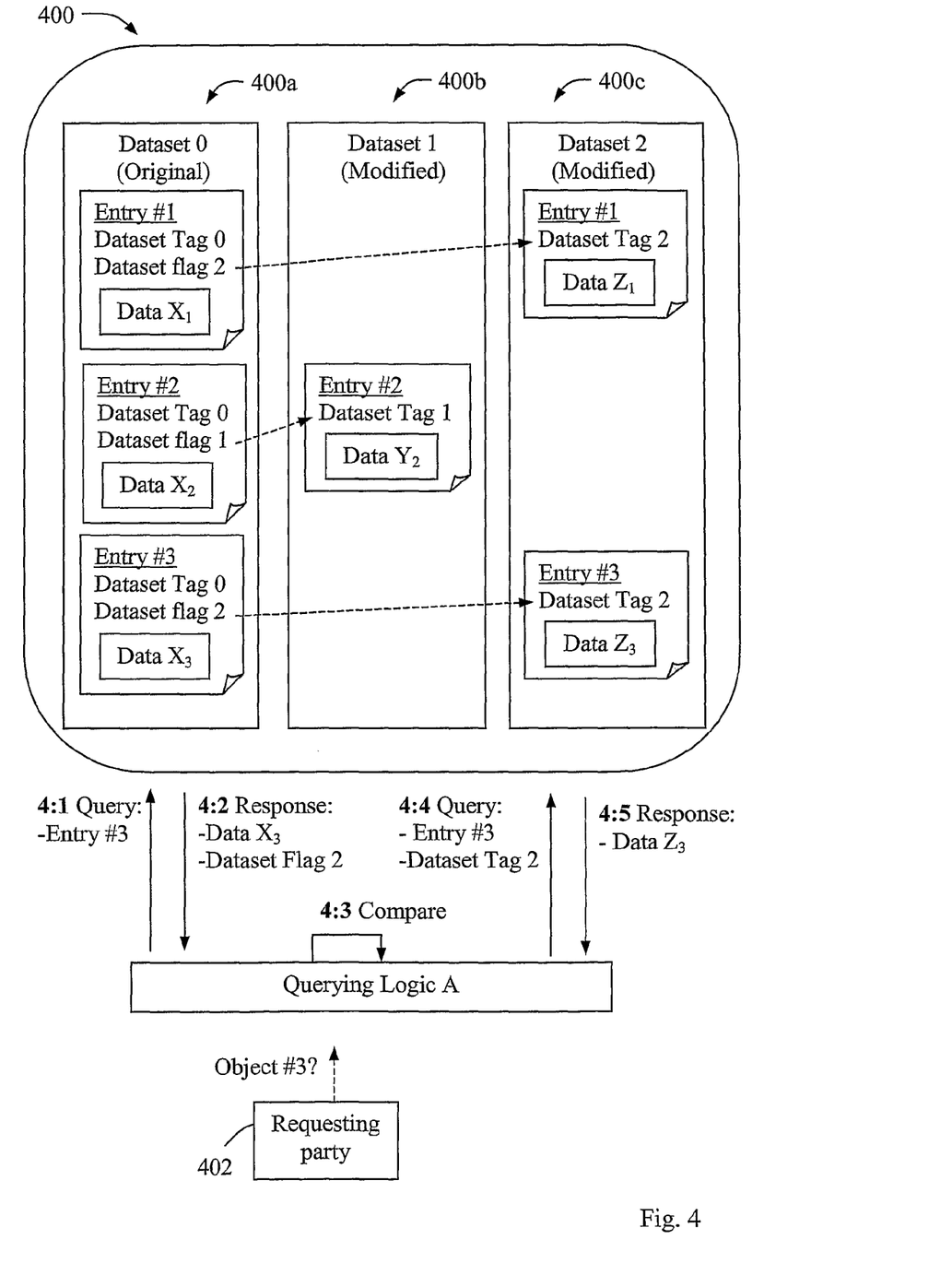
FIG. 4 is a schematic block diagram illustrating a telecommunication database system, according to another embodiment.

Some basic steps shown in FIG. 4 illustrate how an exemplary data query can be executed according to this embodiment. It is assumed that a requesting party 402 wants data from entry #3 ("object #3"). In a first shown step 4:1, the querying logic A accordingly makes a query for entry #3 to serve the requesting party 302, but without including any dataset tag. The database 400 will then respond with data $X_3$ and dataset flag 2 from entry #3 of the original dataset 400*a* as a default, in a next step 4:2.

Since the obtained dataset flag≠0 pointing to an auxiliary dataset, the querying logic A compares the dataset flag in the received entry with an active dataset tag for the requesting party, in a further step 4:3. If the dataset flag is equal to the active dataset tag, another query is placed in a step 4:4 for entry #3 that also specifies the active dataset tag according to the dataset flag, i.e. dataset tag 2. Thereby, the correct data $Z_3$ in entry #3 of dataset 2 is finally obtained from the database 400 in a step 4:5, e.g. for delivery to the requesting party.

The above-described embodiment of FIG. 4 will not add any query complexity in cases when data in the original dataset is valid, i.e. when the dataset flag=0 in the requested data entry, and the queries are thus not affected by the addition of auxiliary datasets since no dataset tag is included the queries. It should be noted that the inclusion of dataset flags in the original data entries according to the example of FIG. 4 does not exclude the possibility to handle data queries in the way described for FIG. 3, i.e. when the queries specify a dataset tag.

Figure 5:
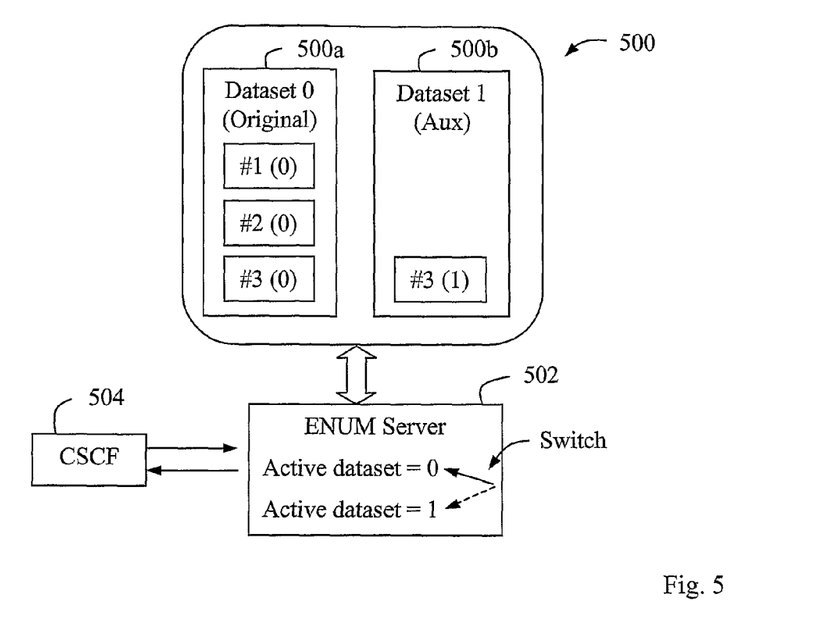
FIG. 5 is a schematic block diagram illustrating a user case with a telecommunication database system, according to yet another embodiment.

FIG. 5 illustrates a practical use case for the present invention when a database 500 with user data is connected to an ENUM server 502 configured to translate circuit-switched telephone numbers into packet-switched user addresses. The ENUM server 502 acts as a querying logic unit according to any of the above-described embodiments for retrieving relevant data from database 500. A session control node 504 for packet-switched multimedia services, denoted CSCF (Call Session Control Function), acts as a requesting party that needs routing data of the users from database 500 in order to control their sessions. Schematically described, the database 500 contains data entries for the users with "circuit-switched data" in an original dataset 500*a* (Dataset 0) and "packet-switched data" in an auxiliary dataset 500*b* (Dataset 1), i.e. a structure similar to the embodiments in FIG. 3 and FIG. 4.

In this case, an operator wants to migrate large sets of users from a PSTN (Public Switched Telephone System) service to an IP service in an IP network. The operator will add users during a period of time to the IP service as entries in the auxiliary dataset, but the added users are still using the old PSTN service according to entries in the original dataset, and the original dataset is therefore set as active in the querying logic of the ENUM server 502.

Then, at a given moment, a limited set of users will switch from the old PSTN service to the new IP service instantly as a trial, by changing the active dataset from original (0) to auxiliary (1) in the ENUM server 502, as indicated by the dashed arrow. If the switch (or "cut-over") is successful, the operator will "commit" all the users to the new service in the same manner. However, if the switch results in problems, e.g. due to configuration errors or the like, the present solution enables the operator to instantly switch the users back to the old PSTN service by simply changing the active dataset in the ENUM server 502 from auxiliary (1) back to original (0).

In this case, the ENUM server 502 will deliver TEL URIs (Universal Resource Identifiers) from the original dataset 500*a* to the CSCF node 504 for ENUM queries as long as the users are still using the old PSTN service (original dataset 0 active). Thereby, the calls will be routed through the PSTN network. After the switch (auxiliary dataset 1 active), the active dataset (i.e. auxiliary dataset 1) will instead contain SIP (Session Initiation Protocol) URIs with domain names and the ENUM responses to CSCF node 504 will thus contain SIP URIs instead. Thereby, the calls or sessions will be routed based on the domain name through the IP network.

Figure 6:
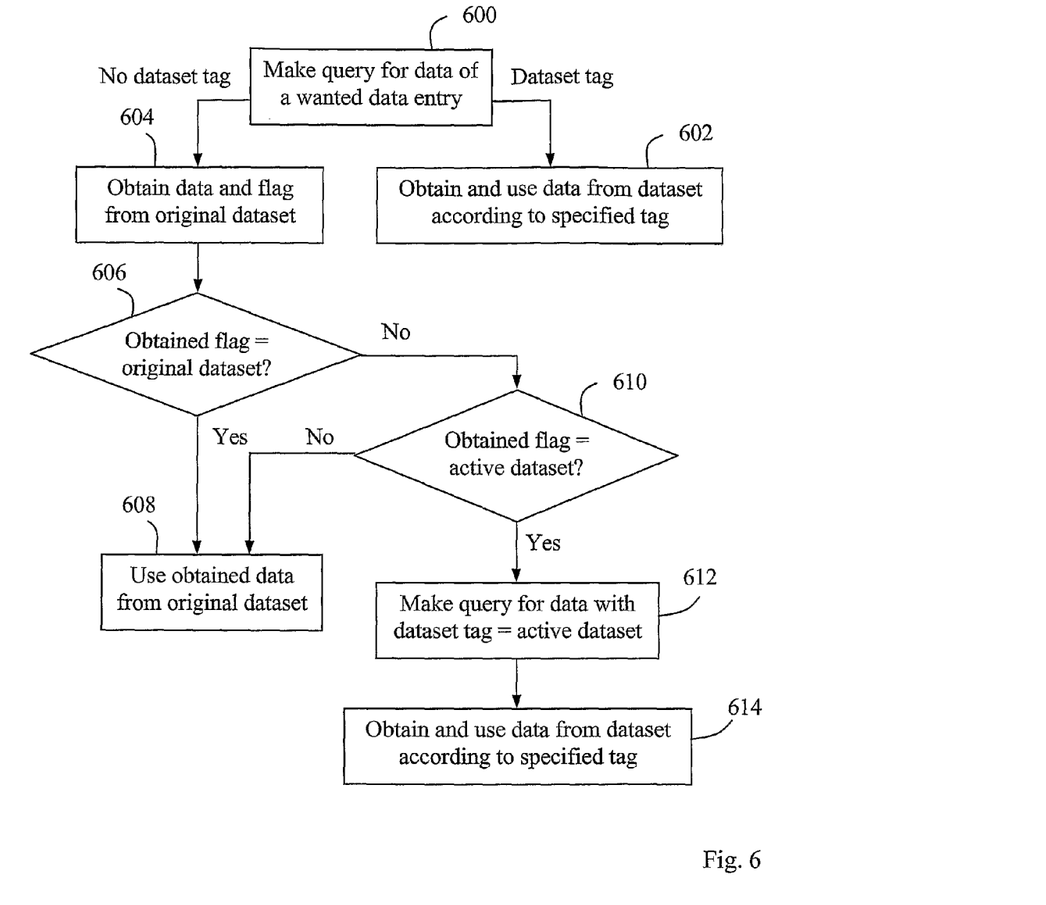
FIG. 6 is a flow chart with steps in a procedure for obtaining data from a database in a telecommunication database system, according to yet another embodiment.

FIG. 6 is a flow chart schematically illustrating a procedure in a querying logic unit for obtaining data from a telecommunication database with an original dataset and one or more auxiliary datasets for data entries of objects in a telecommunication system. The procedure of FIG. 6 is executed basically in accordance with the examples described for FIG. 3 and FIG. 4 above, and depending on whether a dataset tag is specified in an initial data query or not. Thus, each data entry in the database comprises a dataset tag indicating which dataset it belongs to. The querying logic can obtain data of a wanted data entry from a dataset that is determined based on the dataset tag in the data entry, in the following manner.

In a first step 600, an initial query is made for data of a wanted data entry, i.e. object. The procedure is then divided into two branches for dataset tag being specified (right) or not (left) in the initial query. If a dataset tag is specified in the query, data is obtained from the dataset indicated by the given dataset tag and can then be used, in a step 602. In that case, it is not necessary to use dataset flags in the original entries as described for FIG. 5.

On the other hand, if no dataset tag is specified in the initial query, data is obtained from the entry in the original dataset as a default, in a further step 604. A dataset flag is also obtained from that entry, pointing to a specific dataset. In a next step 606, it is checked whether the obtained dataset flag is equal to the original dataset tag, i.e. =0 according to the examples above. If so, the obtained data of the original dataset is valid and can be used in a following step 608.

If the obtained dataset flag is different from the original dataset tag, i.e. implying that the data has been updated for that entry in an auxiliary dataset, it is further checked, in a next step 610, whether the obtained dataset flag is equal to an active dataset configured in the querying logic. If not equal to any active dataset, it can be concluded that the updated entry is not available since the dataset it belongs to is not active in the querying logic. Instead, the obtained data of the original dataset may be used as a default according to step 608, e.g. by delivery to a requesting party. Alternatively, an error message could be sent to the requesting party.

If the obtained dataset flag equals a configured active dataset in step 610, another query is made for data specifying a dataset tag according to the active dataset, i.e. the obtained dataset flag, in a following step 612. Thereby, data of the entry in question is obtained from the dataset according to the specified dataset tag which may ultimately be used, according to a final step 614. In the latter case, data is obtained that has been updated (as the dataset flag points to an auxiliary dataset according to step 606) and is available for use (as the data is obtained according to the configured active dataset in step 614).

Using the present invention according to any of the above-described embodiments, the following advantages may be obtained. The ability to instantly switch from one dataset to another one by changing the active dataset tag in the querying logic allows for both instant activation and rollback of a large number of data entries. For example, in an ENUM database, adding a large number of subscribers may be a rather slow process that could go on for days. Traditionally, this would also mean that the subscribers become available as they are provisioned in the ENUM database. However, using the above described solution, it is possible for the operator to delay the availability of subscriber data until all subscribers have been properly provisioned. Once all subscribers have been properly provisioned, the operator can instantly activate all subscribers at once.

It is also possible for the operator to instantly rollback the activation, e.g. in the case of configuration errors or the like, by simply switching back to the original dataset. The operator may then correct the problems and once again instantly activate all the entries.

The operator may also perform trials, e.g. by first activating only one trial client or a limited set of trial clients in a new dataset of the database. The operator may then execute various tests against the trial client(s) in order to verify the new dataset. Once convinced the dataset is correct, The operator may then proceed to activate the data in the entire (live) system.

By using the two approaches described for FIG. 3 and FIG. 4, respectively, the database system can be optimised for two different scenarios. In the alternative of FIG. 3, the latency of queries towards an auxiliary dataset is reduced at the cost of slightly complicating the query for all queries, including those towards the original dataset. In the other alternative of FIG. 4, queries towards the original dataset have no added complexity, but the latency of queries that terminate in an auxiliary dataset is slightly increased.

The overall logic of the database system chiefly resides in the querying logic and could be configured in such a way that no special adaptations need to be made to the database itself. It is only the structure of the data and the implementation of the provisioning process and querying logic that can provide for all necessary logic. This allows deployment of the invention for any common types of databases without requiring any adaptation work in the database.

While the invention has been described with reference to specific exemplary embodiments, the description should not be taken as limiting the scope of the invention. The present invention is defined by the appended claims.

The invention claimed is:

1. A method in a telecommunication database system for obtaining data for a requesting party from a database containing data entries for a plurality of objects, the method comprising the steps of:
   making a query for data from a wanted data entry, wherein the database comprises an original dataset with data entries holding original data for the objects and an auxiliary dataset with data entries holding updated data for at least some of said objects, wherein the data entries in the original dataset contain a first dataset tag and the data entries in the auxiliary dataset contain a second dataset tag, said dataset tags indicating to which dataset each entry belongs, and wherein each data entry in the auxiliary dataset and a corresponding data entry in the original dataset both refer to the same object such that the original and auxiliary datasets present different views of data for the same objects; and,
   obtaining data of the wanted data entry for the requesting party from one of said original and auxiliary datasets which is determined to be valid for said requesting party based on the dataset tag in said data entry.

2. A method according to claim 1, wherein a wanted dataset tag is specified in said query and the data is obtained from the data entry of the dataset according to the specified dataset tag.

3. A method according to claim 1, wherein the data entries in the original dataset further contain a dataset flag pointing to one of the original and auxiliary datasets, and when no dataset tag is specified in said query, data and a dataset flag is obtained from the wanted data entry in the original dataset, and the correct dataset is determined based on said returned dataset flag.

4. A method according to claim 3, wherein if the obtained dataset flag is equal to the original dataset tag, the data obtained from said original dataset is used.

5. A method according to claim 3, wherein if the obtained dataset flag is different from the original dataset tag, it is checked whether the obtained dataset flag is equal to a dataset tag being set to active for the requesting party, and if not equal, the data obtained from said original dataset is used as default.

6. A method according to claim 3, wherein if the obtained dataset flag is different from the original dataset tag, it is checked whether the obtained dataset flag is equal to a dataset tag being set to active for the requesting party, and if equal, another query is placed indicating the active dataset tag and the data is obtained from the data entry of a dataset according to the indicated dataset tag.

7. A method according to claim 1, wherein information is maintained on which dataset is active and valid to specific requesting parties, thereby presenting different views of the database to the respective requesting parties.

8. A method according to claim 7, wherein the different views presented for specific requesting parties are changed by changing the active dataset for the respective requesting parties.

9. A method according to claim 1, wherein data entries are moved between different datasets by changing their dataset tags.

10. A method according to claim 1, wherein the database comprises a plurality of auxiliary datasets with data entries holding updated data for at least some of said objects and also containing dataset tags indicating to which auxiliary dataset each entry belongs.

11. A telecommunication database system, comprising:
a database containing data entries for a plurality of objects, wherein the database comprises:
an original dataset with data entries holding original data for the objects and,
an auxiliary dataset with data entries holding updated data for at least some of said objects;
wherein the data entries in the original dataset contain a first dataset tag and the data entries in the auxiliary dataset contain a second dataset tag, said dataset tags indicating to which dataset each entry belongs, and wherein each data entry in the auxiliary dataset and a corresponding data entry in the original dataset both refer to the same object such that the original and auxiliary datasets present different views of data for the same objects; and,
a querying logic unit for obtaining data from the database for a requesting party, the querying logic unit being adapted to make a query for data from a wanted data entry and to obtain data of the wanted data entry for the requesting party from one of said original and auxiliary datasets which is determined to be valid for said requesting party based on the dataset tag in said data entry.

12. A system according to claim 11, wherein the querying logic unit is further adapted to specify a wanted dataset tag in said query and obtain the data from the data entry of the dataset according to the specified dataset tag.

13. A system according to claim 11, wherein the data entries in the original dataset further contain a dataset flag pointing to one of the original and auxiliary datasets, and when no dataset tag is specified in said query, the querying logic unit is further adapted to obtain data and a dataset flag from the wanted data entry in the original dataset and determine the correct dataset based on said returned dataset flag.

14. A system according to claim 13, wherein if the obtained dataset flag is equal to the original dataset tag, the data obtained from said original dataset is used.

15. A system according to claim 13, wherein if the obtained dataset flag is different from the original dataset tag, the querying logic unit is further adapted to check whether the obtained dataset flag is equal to a dataset tag being set to active for the requesting party, and if not equal, the data obtained from said original dataset is used as default.

16. A system according to claim 13, wherein if the obtained dataset flag is different from the original dataset tag, the querying logic unit is further adapted to check whether the obtained dataset flag is equal to a dataset tag being set to active for the requesting party, and if equal, make another query indicating the active dataset tag and obtain the data from the data entry of a dataset according to the indicated dataset tag.

17. A system according to claim 11, wherein the querying logic unit is further adapted to maintain information on which dataset is active and valid to specific requesting parties, thereby presenting different views of the database to the respective requesting parties.

18. A system according to claim 17, wherein the querying logic unit is further adapted to change the different views presented for specific requesting parties by changing the active dataset for the respective requesting parties.

19. A system according to claim 11, adapted to move data entries between different datasets by changing their dataset tags.

20. A system according to claim 11, wherein the database comprises a plurality of auxiliary datasets with data entries holding updated data for at least some of said objects and also containing dataset tags indicating to which auxiliary dataset each entry belongs.

21. A database containing data entries for a plurality of objects in a telecommunication system, the database comprising:
an original dataset with data entries holding original data for the objects; and,
an auxiliary dataset with data entries holding updated data for at least some of said objects;
wherein the data entries in the original dataset contain a first dataset tag and the data entries in the auxiliary dataset contain a second dataset tag, said dataset tags indicating to which dataset each entry belongs; and,
wherein each data entry in the auxiliary dataset and a corresponding data entry in the original dataset both refer to the same object such that the original and auxiliary datasets present different views of data for the same objects;
whereby a querying logic unit can make a query for data from a wanted data entry and obtain data for a requesting party of the wanted data entry from one of said original and auxiliary datasets which is determined to be valid for said requesting party based on the dataset tag in said data entry.

* * * * *